(12) United States Patent
Hardt et al.

(10) Patent No.: US 7,102,883 B2
(45) Date of Patent: Sep. 5, 2006

(54) MEMORY PACKAGE

(75) Inventors: Thomas T. Hardt, Missouri City, TX (US); George D. Megason, Spring, TX (US); Kurt A. Manweiler, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 276 days.

(21) Appl. No.: 10/742,043

(22) Filed: Dec. 19, 2003

(65) Prior Publication Data
US 2005/0135054 A1  Jun. 23, 2005

(51) Int. Cl.
*G06F 1/16* (2006.01)
(52) U.S. Cl. .................. 361/684; 361/679; 361/683
(58) Field of Classification Search ............ 361/679, 361/683–687
See application file for complete search history.

(56) References Cited

U.S. PATENT DOCUMENTS

| | | | |
|---|---|---|---|
| 6,052,278 A | 4/2000 | Tanzer et al. | |
| 6,272,017 B1 | 8/2001 | Klatt et al. | |
| 6,338,113 B1 | 1/2002 | Kubo et al. | |
| 6,354,164 B1 | 3/2002 | Megason et al. | |
| 6,382,986 B1 | 5/2002 | Kim et al. | |
| 6,498,731 B1 | 12/2002 | Roscoe et al. | |
| 6,608,564 B1 * | 8/2003 | Post et al. ............... | 340/693.5 |
| 6,819,560 B1 * | 11/2004 | Konshak et al. ............ | 361/687 |
| 6,934,150 B1 * | 8/2005 | Kitchen et al. ............. | 361/685 |

* cited by examiner

*Primary Examiner*—Yean-Hsi Chang

(57) ABSTRACT

A memory package comprising a first circuit board having a plurality of memory element sockets and a second circuit board coupled to the first circuit board and comprising a controller chip. The first and second circuit boards are disposed within a tray having a base and two sides. A handle is connected to the tray such that the handle is pivotal with respect to the tray. The handle has a lever system and latch that is slidably engaged with the lever system.

10 Claims, 4 Drawing Sheets

MEMORY PACKAGE

BACKGROUND

In certain computer-based systems, such as servers, there may be items that require upgrades, repair or replacement. For example, servers may use a plurality of memory modules that may be upgraded or replaced periodically. In some systems, the server is shut down while the appropriate memory modules are removed or replaced. This can be problematic when the server or other computer-based system is utilized in an application that requires or benefits from continuous operation.

SUMMARY

A memory package comprising a first circuit board having a plurality of memory element sockets and a second circuit board coupled to the first circuit board and comprising a controller chip. The first and second circuit boards are disposed within a tray having a base and two sides. A handle is connected to the tray such that the handle is pivotal with respect to the tray. The handle has a lever system and latch that is slidably engaged with the lever system.

BRIEF DESCRIPTION OF THE DRAWINGS

For a detailed description of certain embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the verb "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. The embodiments disclosed should not be interpreted, or otherwise used, as limiting the scope of the disclosure unless otherwise specified. In addition, one skilled in the art will understand that the following description has broad application, and the discussion of any embodiment is meant only to be exemplary of that embodiment, and not intended to intimate that the scope of the disclosure is limited to that embodiment.

Figure 1:
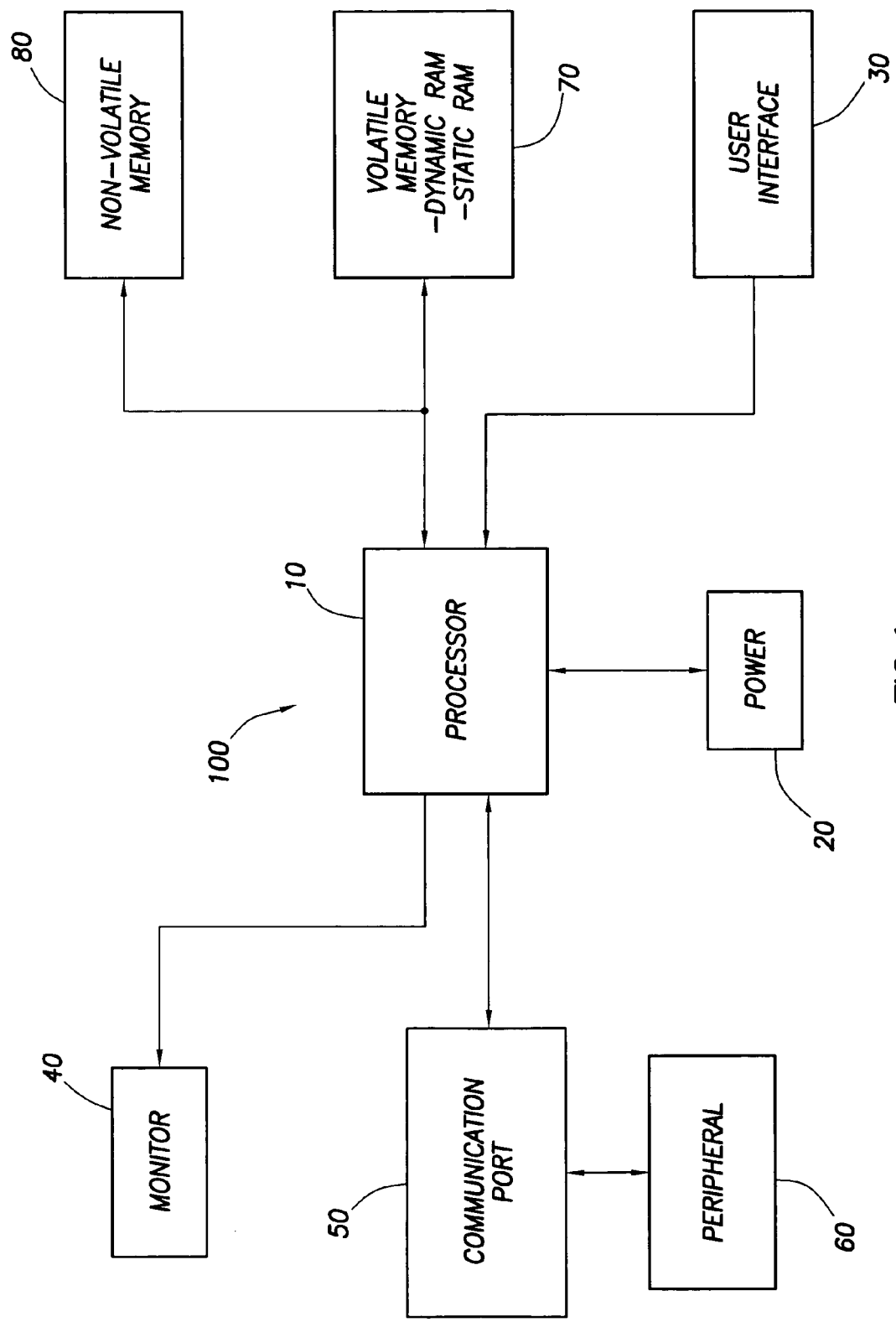
FIG. 1 illustrates a block diagram of a processor-based device in accordance with embodiments of the invention.

Referring to FIG. 1, a block diagram is illustrated depicting an exemplary computer-based system 100. Computer-based system 100 may be any of a variety of different types, such as a server, a personal organizer, a notebook computer, a personal computer, a workstation, an Internet server, or a minicomputer. In some computer-based systems, a processor may control many of the functions of the system. In the illustrated embodiment, processor 10 controls the functions of computer-based system 100.

Computer-based system 100 may comprise a power supply 20. If system 100 is portable, power supply 20 may comprise permanent batteries, replaceable batteries, and/or rechargeable batteries. Power supply 20 may also comprise an A/C adapter, so that the system may be plugged into a wall outlet, for instance. In fact, power supply 20 may also comprise a DC adapter, so that system 100 may be plugged into the DC voltage of a vehicle.

Various other devices may be coupled to processor 10, depending upon the functions that system 100 performs. For example, a user interface 30 may be coupled to processor 10. Examples of user interfaces 30 may comprise buttons, switches, a keyboard, a light pen, a mouse, and/or a voice recognition system. A output device 40 may also be coupled to processor 10. Examples of output devices 40 may comprise: a television screen, a computer monitor, LEDs, or even an audio output device. A communications port 50 may also be coupled to processor 10. Communications port 50 may be adapted to be coupled to a peripheral device 60, such as a printer, a computer or an external modem.

Processor 10 may utilize programming to control the function of system 100. Memory may be coupled to processor 10 to store and facilitate execution of the programming. For example, processor 10 may be coupled to a volatile memory 70 and a non-volatile memory 80. Non-volatile memory 80 may comprise a read only memory (ROM), such as an EPROM, to be used in conjunction with volatile memory 70. The size of the ROM may be selected to be just large enough to store any necessary operating system, application programs, and fixed data. Volatile memory 70, on the other hand, may be quite large so that it can store dynamically loaded applications. Additionally, non-volatile memory 80 may comprise a high capacity memory such as a disk or tape drive memory.

A variety of memory modules, such as DRAMs, SDRAMs, SRAMs can be utilized for a given peripheral device or application. The memory modules may be customized for a specific device or be in a standard form widely used in the electronic industry. For example, an SDRAM may be packaged as an industry standard dual inline memory module (DIMM). The present protective assembly, discussed below, is particularly amenable to protecting electric components such as memory modules that are utilized in, for example, a server.

Figure 2:
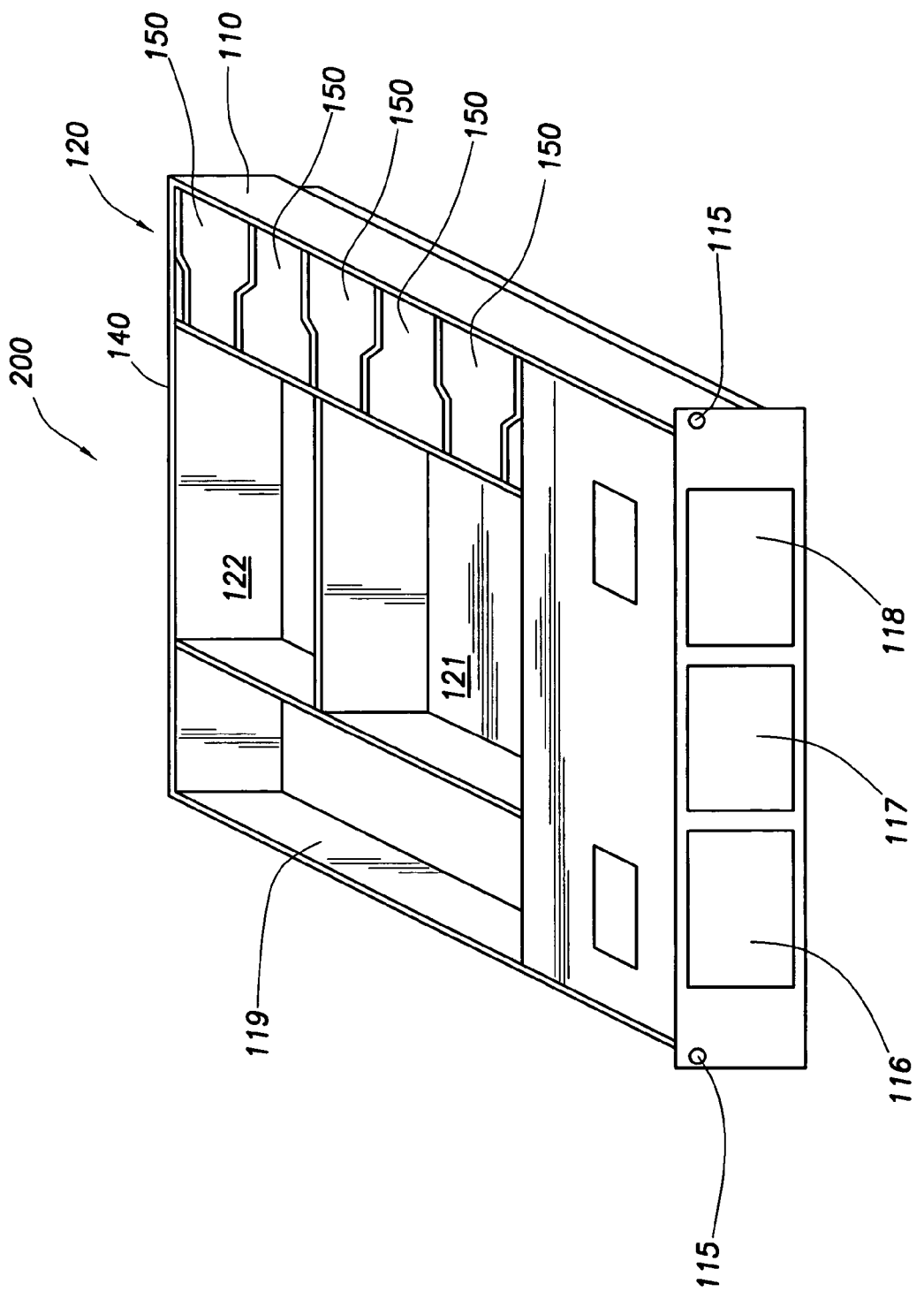
FIG. 2 illustrates a perspective view of a processor-based device in accordance with embodiments of the invention.

Referring to FIG. 2, an exemplary processor-based device 200 is illustrated. In the exemplary embodiments of FIG. 2, processor-based device 200 comprises a chassis 110 configured to house the components of processor-based device 200. Chassis 110 may be secured to a rack, or other securing system, by, for example, mounting screws 115. Processor-based device 200 may be configured with several modules that are housed and coupled together within chassis 110. The modules enable system 100 to be more easily assembled and repaired. Modules may comprise a power supply module 116, hard drive modules 117, media modules 118, expansion card modules 119, memory modules 120, processor modules 121, and cooling modules 122.

In the illustrated embodiments, memory module 120 utilizes five memory cartridges 150. Memory elements, such as DRAMs and SDRAMs, are housed within each of the memory cartridges 150. Memory cartridges 150 are installed and removed from the top 140 of chassis 110. In the illustrated embodiments, the storage capacity of memory within the five memory cartridges is sufficient to enable data to be stored redundantly in memory modules among a plurality of memory cartridges, enabling a memory cartridge to be removed without suffering a loss of operation of the device. Additionally, in the illustrated embodiments, the memory cartridges are hot-pluggable, i.e., a memory cartridge 150 may be removed from device 200 without having to disconnect power or halt operation of device 200.

Figure 3:
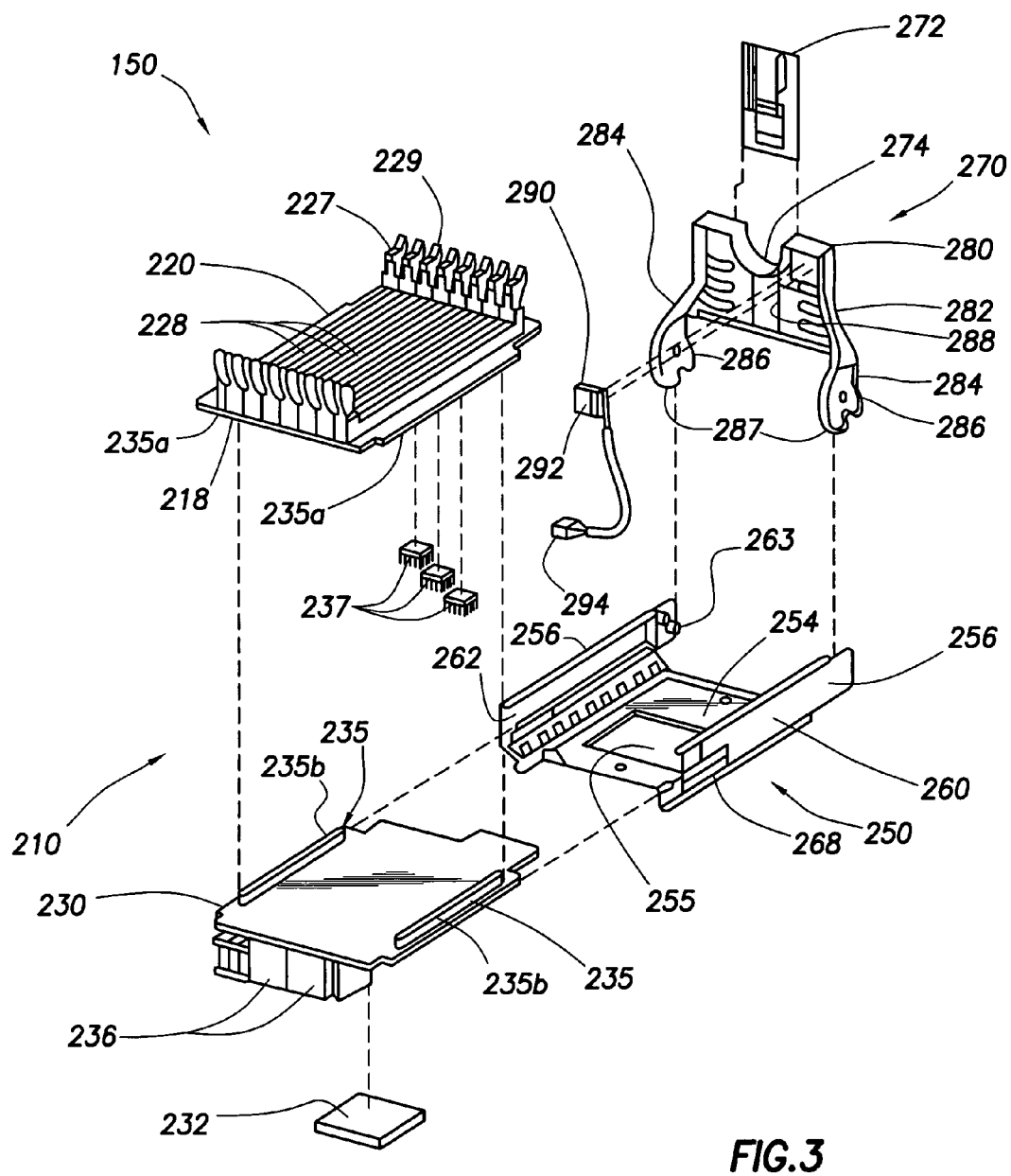
FIG. 3 illustrates an exploded view of a memory cartridge in accordance with embodiments of the invention.
Figure 4:
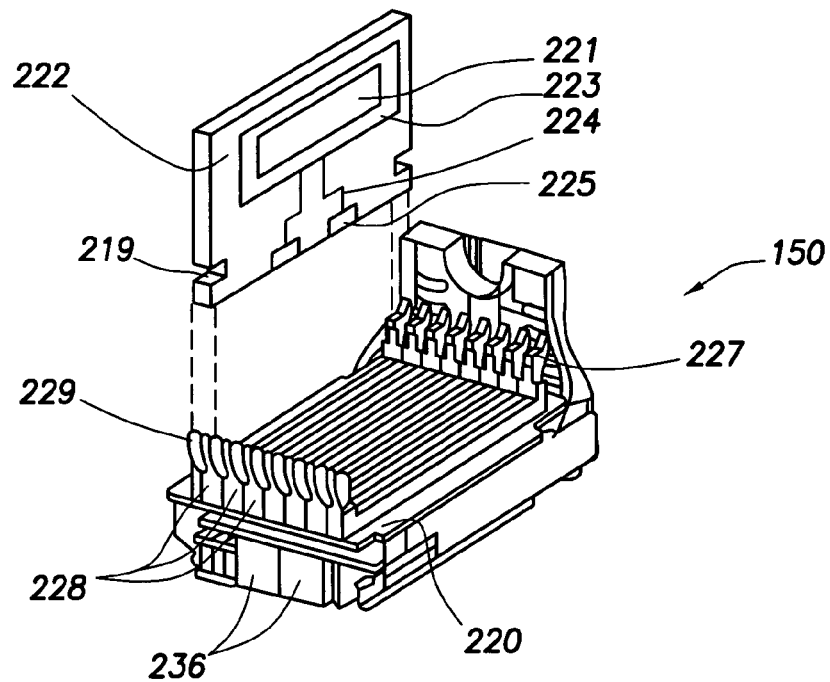
FIG. 4 illustrates a perspective view of a memory cartridge and memory module in accordance with embodiments of the invention.
Figure 5:
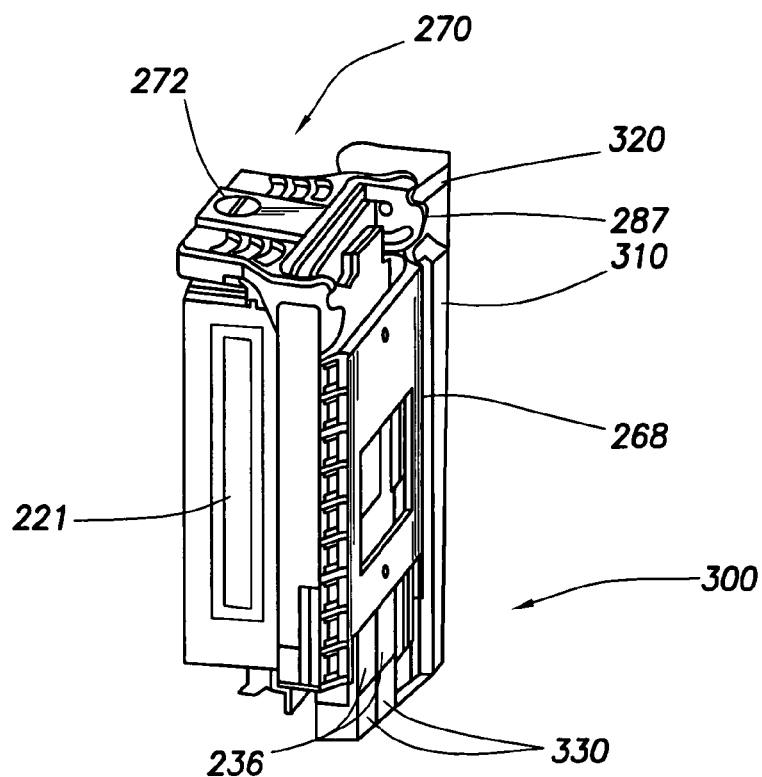
FIG. 5 illustrates a perspective view of a memory cartridge in accordance with embodiments of the invention.

Referring now to FIGS. 3–5, an exemplary memory cartridge 150 is shown. Memory cartridge 150 comprises electronic assembly 210 and tray assembly 250. Electronic assembly 210 comprises the electronic circuitry and components to connect memory elements 221 to processor-based device 200. Tray assembly 250 comprises the structural support for electronic assembly 210 to align and connect to processor-based device 200.

Electronic assembly 210 comprises a first printed circuit board 220 and a second printed circuit board 230. First printed circuit board 220 comprises an upper side 217 including sockets 228 for accepting memory elements 221 and clips 227 with releases 229 for affixing the memory elements to the sockets. Circuit board 220 also comprises a lower side 218 including mating portions 235a of connectors 235 and heat sinks 237.

Second printed circuit board 230 comprises an upper side 216 including mating portions 235b of connectors 235 and a lower side 215 comprising a controller chip 232. Memory controller 232 controls the transfer of data to and from the memory elements 221. Circuit board 230 also comprises electrical connectors 236, which is electrically coupleable to a respective multi-pin connector (not shown) disposed within processor-based device 200. Thus, when the multi-pin connectors are joined, a conductive path from memory element 221 through memory cartridge 150 to processor-based device 200 is completed.

Connectors 235 interconnect first printed circuit board 220 and second printed circuit board 230 when the two boards 220, 230 are physically placed in parallel. Placing the two circuit boards 220, 230 in parallel enables controller chip 232 to be placed in close proximity to sockets 228, thereby minimizing the distance an electrical signal must travel between the controller chip and a memory element 221. As the distance the signal must travel decreases, the speed with which memory elements 221 can be accessed increases.

Tray assembly 250 comprises tray 260 and handle 270. Tray assembly 250 supports and protects electronic assembly 210, while providing the alignment and attachment mechanism for installing memory cartridge 150 to processor-based device 200. Tray assembly 250 may be constructed of any material capable of protecting electronic assembly 210. For example, tray assembly 150 may be constructed entirely or partially from a plastic.

Tray 260 comprises a base 254 and two opposing sides 256. In exemplary embodiments, base 254 includes an opening 255 that allows air to circulate within package 250. Opening 255 is positioned so as to substantially align with controller chip 232 in order to help keep electronic assembly 210 at a suitable operating temperature.

Opposing sides 256 comprise inner guides 262, which receive electronic assembly 210, outer guides 268, which are received by processor-based device 200. Both inner and outer guides 262, 268 may be guide rails or other means suitable for guiding the respective components into place. Opposing sides 256 also comprise pins 263 that pivotally connect to handle 270.

Handle 270 comprises lever 280, latch 272, and switch 290. Lever system 280 comprises body 282 and two extending arms 284. Each arm 284 comprises receptacles 286, which receive pins 263, and cam surfaces 287, which interface with processor-based device 200. Body 282 comprises slot 288, which receives latch 272, and a finger release area 274. Latch 272 is slidably disposable between an open and a closed positions within slot 288. In the open position, finger release area 274 is uncovered. In the closed position, latch 272 covers finger release area 274.

Switch 290 includes sensor 292, which detects the position of latch 272. Switch 290 is connected to electronic assembly 210 via a pin or plug 294. Switch 290 enables processor-based device 200 to monitor the position of latch 272, in order to determine if a particular memory cartridge 150 is about to be removed.

As shown in FIG. 4, first circuit board 220 can receive at least one memory element 221, e.g., a DIMM. Exemplary circuit boards accommodate eight DIMMs. Memory element 221 is mounted in a socket 223 on a minor printed circuit board 222, hereinafter referred to as "daughterboard 222." Conductive traces 224 on daughterboard 222 electrically couple memory element 221 to conductive strips 225 along an edge of daughterboard 222. Daughterboard 222 is installable into socket 228 mounted on circuit board 220.

Socket 228 mechanically secures daughterboard 222 to circuit board 220. Daughterboard 222 may be manufactured with small notches 219 on the sides to interface with clips 227 and hold daughterboard 222 securely within the socket. Each clip 227 has a thumb release 229 that, when operated, pulls the clip from the corresponding notch 219, allowing the subject daughterboard to be removed from the socket 228.

Once memory elements 221 connected to sockets 228, memory cartridge 150 can then be installed in processor-based device 200. Memory cartridge 150 is inserted into a suitable receiving slot 300, a portion of which is shown in FIG. 5. External guides 268 may align memory cartridge 150 corresponding guides 310 within receiving slot 300. Once fully inserted into guides 310, handle 270 is rotated downward to engage cam surface 287 with corresponding tabs 320 in receiving slot 300. Cam surface 287 helps provide the downward force to set memory cartridge 150 into processor-based device 200 and engage electrical connector 236 with the respective multi-pin connector 330 disposed within the processor-based device. Latch 272 is then moved into the closed position and switch 290 relays a signal to processor-based device 200 that memory cartridge 150 is installed.

Memory cartridge 150 may be removed by moving latch 272 into the open position to reveal finger release area 274 and activate switch 290 to relay a message to processor-based device 200 that memory cartridge 150 is about to be disconnected. Handle 270 is rotated upward and cam surface 287 releases tab 320 and disengages connectors 236 and 330. Handle 270 can then be used to lift memory cartridge 150 up and out of slot 300.

The above discussion is meant to be illustrative of the principles and various embodiments of the present invention. Numerous variations and modifications will become apparent to those skilled in the art once the above disclosure is fully appreciated. For example, the principles of the present invention could easily be adapted for use in a desktop or other non-portable computer system. Finally, the use of the memory module and/or memory package may find application well outside the embodiments described in this specification, and thus the specification should not be construed as limited only to personal computer systems. It is intended that the following claims be interpreted to embrace all such variations and modifications.

What is claimed is:

1. A memory package comprising:
   a first circuit board having a plurality of memory element sockets;
   a second circuit board coupled to said first circuit board and comprising a controller chip;
   a tray having a base and two sides, said first and second circuit boards disposed within said tray; and
   a handle having a lever system and latch, said latch slidably engaged with said lever system;
   wherein said tray and handle are connected to each other such that said handle is pivotal with respect to said tray; and
   wherein said latch further comprises a sensor that detects whether said latch is in an open or closed position.

2. The memory package of claim 1 wherein said lever system comprises a cam.

3. The memory package of claim 1 wherein said tray further comprises a set of inner guides along the two sides, allowing said first and second circuit boards to be received within said tray.

4. The memory package of claim 1 wherein said tray further comprises a set of outer guides along the two sides, allowing the memory package to be received within a processor-based device.

5. The memory package of claim 1 wherein said tray further comprises an opening in the base, allowing air to circulate within the package.

6. A memory module comprising:
   a first circuit board having a plurality of memory elements; and
   a second circuit board having a memory controller;
   wherein said first and second boards are connected to each other such that said memory elements are in electrical connection with said memory controller and said first and second boards are physically parallel to each other, wherein said first and second boards are connected to each other via a connector, with a first portion of the connector located on said first board and a second portion of the connector located on said second board, such that when the two boards are in parallel, the first and second portions mate, forming the connection.

7. The memory module of claim 6 wherein the memory elements are DIMMs.

8. The memory module of claim 7 wherein the first circuit board has eight DIMMs.

9. A memory cartridge comprising:
   a electronic assembly comprising two parallel circuit boards, wherein one of the circuit boards can accept memory elements and the other circuit board has a memory controller chip; and
   a tray assembly comprising a tray holding the electronic assembly;
   a lever system pivotally connected to said tray and having a latch slidably engaged thereto; and
   a switch operable to monitor the position of the latch.

10. The memory cartridge of claim 9 wherein the cartridge is hot pluggable.

* * * * *